United States Patent
Yeh et al.

(10) Patent No.: US 7,747,349 B2
(45) Date of Patent: Jun. 29, 2010

(54) MOBILE ROBOT PLATFORM AND METHOD FOR SENSING MOVEMENT OF THE SAME

(75) Inventors: Syh-Shiuh Yeh, Taipei (TW); Meng-Chun Chen, Tainan County (TW); Kuo-Shih Tseng, Taiping (TW); Mao-Feng Tu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 947 days.

(21) Appl. No.: 11/385,797

(22) Filed: Mar. 22, 2006

(65) Prior Publication Data
US 2007/0150096 A1 Jun. 28, 2007

(30) Foreign Application Priority Data
Dec. 26, 2005 (TW) .............. 94146492 A

(51) Int. Cl.
*G06F 19/00* (2006.01)
(52) U.S. Cl. .............. 700/245; 180/20; 180/21; 180/252; 180/253; 280/124.114
(58) Field of Classification Search .......... 180/20, 180/21, 252, 253; 280/124.114; 700/245
See application file for complete search history.

(56) References Cited

U.S. PATENT DOCUMENTS

| | | | | |
|---|---|---|---|---|
| 3,539,782 A | * | 11/1970 | Littleton | 377/24 |
| 4,782,453 A | * | 11/1988 | Bauer et al. | 701/200 |
| 4,849,696 A | * | 7/1989 | Brun et al. | 324/252 |
| 5,323,867 A | * | 6/1994 | Griffin et al. | 180/22 |
| 5,579,488 A | * | 11/1996 | Ikeda | 710/100 |
| 5,924,512 A | * | 7/1999 | Wada | 180/253 |
| 6,109,379 A | * | 8/2000 | Madwed | 180/65.51 |
| 6,230,415 B1 | * | 5/2001 | Fodor | 33/300 |
| 6,408,230 B2 | * | 6/2002 | Wada | 701/1 |
| 6,438,456 B1 | * | 8/2002 | Feddema et al. | 700/245 |
| 6,491,127 B1 | * | 12/2002 | Holmberg et al. | 180/252 |
| 6,540,039 B1 | * | 4/2003 | Yu et al. | 180/253 |
| 6,760,678 B1 | * | 7/2004 | Hon et al. | 702/92 |
| 6,796,618 B2 | * | 9/2004 | Harris | 301/5.1 |
| 6,810,976 B2 | * | 11/2004 | Rohrs | 180/22 |
| 6,853,877 B1 | * | 2/2005 | Slater et al. | 700/245 |
| 6,871,411 B1 | * | 3/2005 | Kang et al. | 33/356 |
| 6,913,102 B2 | * | 7/2005 | Sugata et al. | 180/253 |
| 6,965,209 B2 | | 11/2005 | Jones | 318/567 |
| 6,991,059 B2 | * | 1/2006 | Stubbe | 180/253 |

(Continued)

FOREIGN PATENT DOCUMENTS

TW 502690 9/2002

OTHER PUBLICATIONS

Kevin L. Moore and Nicholas S. Flann, a six-wheeled omnidirectional autonomous mobile robot, Dec. 2000, IEEE control systems magazine, pp. 53-66.*

(Continued)

*Primary Examiner*—Khoi Tran
*Assistant Examiner*—Jaime Figueroa
(74) *Attorney, Agent, or Firm*—WPAT, PC; Justin King

(57) ABSTRACT

A mobile robot platform and a method for sensing movement of the same are disclosed, which utilize two omni-directional meter wheels perpendicular to each other and a magnetic sensing module for detecting a moving condition of the platform moving on a planar surface while transmitting the detected moving condition to a signal processing unit to calculate the position, velocity, angular position and angular velocity of the platform.

24 Claims, 6 Drawing Sheets

U.S. PATENT DOCUMENTS

| | | | | |
|---|---|---|---|---|
| 7,127,823 | B2* | 10/2006 | Parks et al. | 33/356 |
| 7,296,643 | B2* | 11/2007 | Philipson | 180/65.1 |
| 7,310,882 | B2* | 12/2007 | Siraky et al. | 33/1 PT |
| 7,399,258 | B1* | 7/2008 | Sugar et al. | 482/54 |
| 7,426,970 | B2* | 9/2008 | Olsen | 180/65.1 |
| 7,472,005 | B2* | 12/2008 | Ephraim | 701/41 |
| 2005/0032526 | A1* | 2/2005 | Chen et al. | 455/456.1 |
| 2005/0043851 | A1* | 2/2005 | Allman et al. | 700/213 |
| 2005/0213459 | A1* | 9/2005 | Nishio et al. | 369/59.1 |
| 2006/0070250 | A1* | 4/2006 | Siraky et al. | 33/1 PT |

OTHER PUBLICATIONS

Ushimi et al., Tracking control of omni-directional vehicles using two wheels caster type odometer, May 2004, Journal of robotics and mechatronics, vol. 16 No. 4, pp. 404-405.*

Xiao et al., A mobile robot platform with DSP-based controller and omnidirectional vision system, Aug. 2004, Proceedings of the 2004 IEEE International conference on robotics and Biomimetics, China.*

Yu et al., Omni-Directional Mobility Using Active Split Offset Castors, Sep. 2004, 26th Biennial Mechanics and Robotics Conference, ASME, Journal of Mechanical design, vol. 126, pp. 822-829.*

Dubowsky et al., PAMM—A Robotic Aid to the Elderly for Mobility Assistance and Monitoring A Helping-Hand for the Elderly, Apr. 2000, IEEE, pp. 570-576.*

Muir et al., Kinematic Modeling for Feedback Control of an Omnidirectional Wheeled Mobile Robot, 1987, IEEE, pp. 1772-1778.*

Pin, Francois, A New Family of Omnidirectional and Holonomic Wheeled Platforms, Aug. 1994, IEEE Transaction in Robotics and automation, vol. 10, No. 4, pp. 480-489.*

* cited by examiner

MOBILE ROBOT PLATFORM AND METHOD FOR SENSING MOVEMENT OF THE SAME

FIELD OF THE INVENTION

The present invention relates to a mobile robot platform and a method for sensing movement of the same, and more particularly, to a mobile robot platform utilizing two omni-directional meter wheels, which are perpendicular to each other, and a magnetic sensing module for detecting a movement of the platform.

BACKGROUND OF THE INVENTION

In general, moving conditions of a mobile platform are detected using sensors that usually are detection device adopting means of encoding, light beam, locality, acceleration, and so on.

Among those detection methods for detecting moving conditions of a mobile platform, encoding by rotary encoders is the most commonly practiced. By mounting rotary encoders on wheel shafts of a mobile platform, physical quantities relating to the moving conditions of the mobile platform, such as position, velocity, angular position, angular velocity, etc., can be obtained and calculated from the detection of rotation difference of wheel shafts. However, the calculation of the mobile platform's moving conditions is based on the geometric of the mechanism of the mobile platform, which is easily affected by certain external factors. For instance, wheel slippery might cause enormous error in the calculation. Therefore, constant calibration is required while applying rotary encoder for detecting moving conditions of a mobile platform.

As for the method adopting light beam as the optical means for detecting moving conditions of a mobile platform, it is usually accomplished by mounting light emitters and light receivers on the mobile platform. In general, the light beam used in the foregoing optical method can be laser ray or infrared ray. It is known that the optical method is capable of detecting the distance between the mobile platform and a target object, and also the velocity of the mobile platform. However, when it comes to the detection of the absolute position of the mobile platform, other types of sensor are required for assisting the detection of the optical method.

Conventionally, the locality of a mobile platform is estimated and measured by electrical compass or inertial meter, and so on. However, such devices like electrical compass are only good for detecting the rotation of the mobile platform. Moreover, although devices like accelerometers can be used for detecting moving conditions of the mobile platform, the moving conditions of position and velocity can not be acquired directly, but will require to perform calculations of second order integration and first order integration on the detection result that is more than likely to cause more detection error.

In view of the above description, it is needed to have a mobile robot platform and a method for sensing movement of the same, which are capable of simultaneously detecting the physical quantities of the platform, such as position, velocity, angular position and angular velocity, etc, such that not only the accuracy of the detection can be increase while reducing error caused by all kinds of possible factors, but also the complexity of applying the method can be reduced.

SUMMARY OF THE INVENTION

It is the primary object of the present invention to provide a mobile robot platform and a method for sensing movement of the same, which is capable of simultaneously detecting the physical quantities of the platform, such as position, velocity, angular position and angular velocity, etc.

It is another object of the invention to provide a specifically designed monoaxial omni-directional meter wheel, which is substantially an omni-directional wheel having a rotary encoder mounted thereon for measuring a straight line moving distance and velocity of a mobile platform.

It is yet another object of the invention to provide a biaxial omni-directional meter wheel, which is substantially a device composed of two monoaxial omni-directional meter wheels, being arranged perpendicular to each other, that not only is capable of measuring a straight line distance and velocity of a moving mobile platform measured respectively along the two perpendicular axes of the biaxial omni-directional meter wheel, but also the moving direction of the platform by utilizing the detection of the two rotary encoders mounted respectively on the two omni-directional wheel of the two monoaxial omni-directional meter wheels.

To achieve the above objects, the present invention provides a mobile robot platform, comprising: a frame, at least an omni-directional meter wheel, a magnetic sensing module and a signal processing unit. Each omni-directional meter wheel is arranged on the frame, which is further comprised of: an omni-directional wheel; and a rotary encoder, capable of issuing a pulse signal with respect to the rotation of the omni-directional meter wheel. The magnetic sensing module is also arranged on the frame, which is capable of issuing a bit signal with respect to the variation of geomagnetic strength. The signal processing unit is used for processing the bit signal and the pulse signal.

In a preferred aspect of the invention, the signal processing unit further comprises: at least a decoder, for decoding the pulse signal and generating a count signal accordingly; at least a difference operator, for performing a calculation of difference upon the count signal to generate a difference signal accordingly; a position unit, for performing a position calculation upon the count signal to generate a position signal accordingly; and a velocity unit, for performing a velocity calculation upon the difference signal to generate a velocity signal accordingly.

In another preferred aspect of the invention, the signal processing unit further comprises: at least a decoder, for decoding the bit signal so as to generate a digital signal accordingly; at least a difference operator, for performing a calculation of difference upon the digital signal to generate a difference signal accordingly; an orientation unit, for performing an orientation calculation upon the digital signal to generate an angular position signal accordingly; and a rotation unit, for performing a rotation calculation upon the digital signal to generate an angular speed signal accordingly.

Preferably, the signal processing unit further comprises a central control unit, which is used for monitoring the moving conditions of the frame of the mobile robot platform.

Preferably, a plurality of rollers can be arranged on the frame, that each can be a free-rolling roller or a power-driven roller, driving by a power driving unit. Moreover, an elastic member is arranged in the omni-directional meter wheel for buffering the vibrations caused when the rotating omni-directional wheel comes into contact with ground. Furthermore, the magnetic sensing module can be an electrical compass.

To achieve the above objects, the present invention further provides a method for sensing movements of a moving mobile robot platform, which comprises the steps of: providing a first omni-directional meter wheel and a second omni-directional meter wheel; decoding a pulse signal issued by the first omni-directional meter wheel to generate a first count signal while decoding another pulse signal issued by the second omni-directional meter wheel to generate a second count signal; performing a position calculation upon the first count signal and the second count signal to generate a position signal; performing a calculation of difference upon the first count signal to generate a first difference signal while performing a calculation of difference upon the second count signal to generate a second difference signal; performing a velocity calculation upon the first difference signal and the second difference signal to generate a velocity signal.

In a preferred aspect of the invention, the sensing method further comprises the steps of: providing a magnetic sensing module; decoding a bit signal issued by the magnetic sensing module to generate a digital signal; performing an orientation calculation upon the digital signal to generate an angular position signal; performing a calculation of difference upon the digital signal to generate a difference signal; performing a rotation calculation upon the difference signal to generate an angular velocity signal.

Preferably, the first omni-directional meter wheel, the second omni-directional meter wheel and the magnetic sensing module are all arranged on the frame of the mobile robot platform while the first omni-directional meter wheel is orientated to perpendicular to the second omni-directional meter wheel. Moreover, the magnetic sensing module can be an electrical compass.

Preferably, the frame further comprises a signal processing unit for receiving the pulse signal of the first omni-directional meter wheel, the pulse signal of the second omni-directional meter wheel and the bit signal of the magnetic sensing module.

Preferably, the signal processing unit further comprises: at least a decoder, for performing the decoding operation; at least a difference operator, for performing the calculation of difference; a position unit, for performing the position calculation to obtain the position of the frame of the mobile robot platform; a velocity unit, for performing the velocity calculation to obtain the velocity of the frame of the mobile robot platform; an orientation unit, for performing the orientation calculation to obtain the angular position of the frame of the mobile robot platform; a rotation unit, for performing the rotation calculation to obtain the angular velocity of the frame of the mobile robot platform; and a central control unit, for receiving the position signal, the velocity signal, the angular position signal and the angular velocity signal so as to monitor the moving frame of the mobile robot platform.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1:
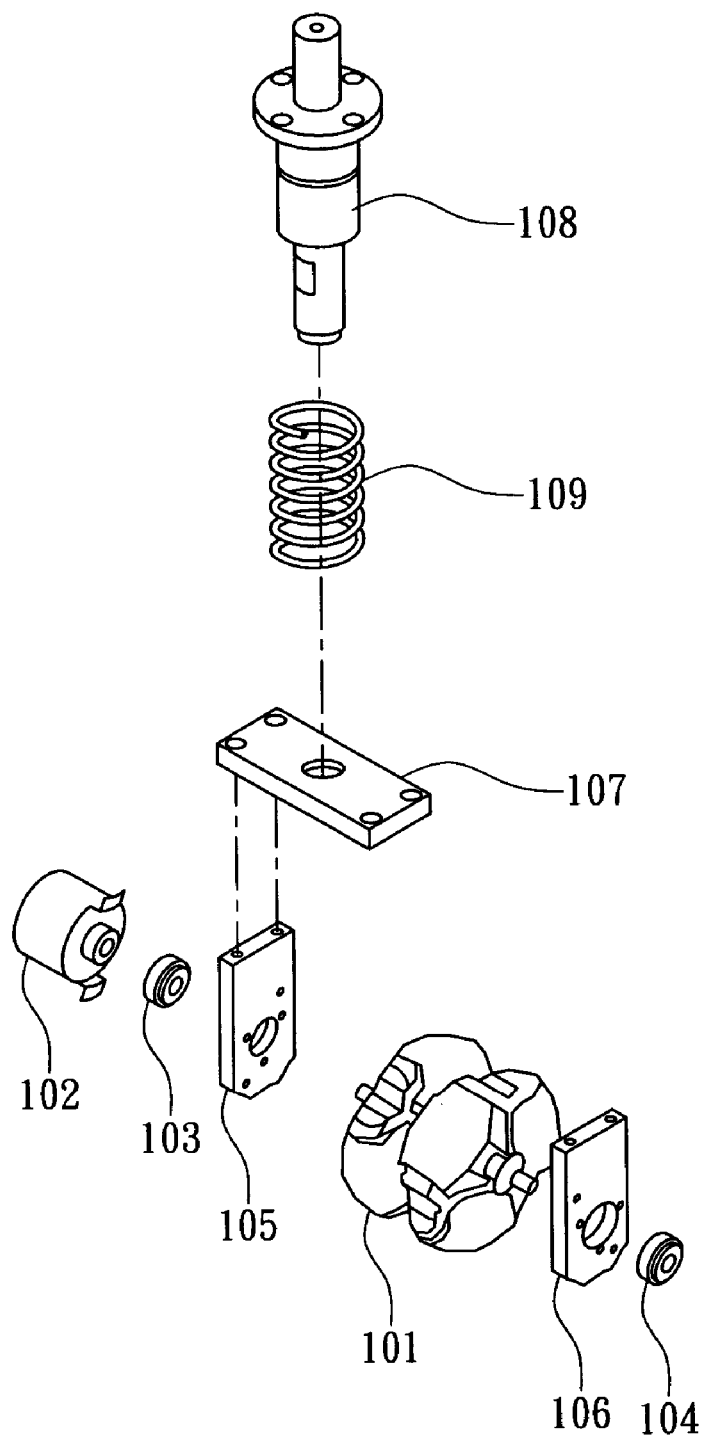
FIG. 1 is an explode view of an omni-directional meter wheel according to a preferred embodiment of the invention.
Figure 2:
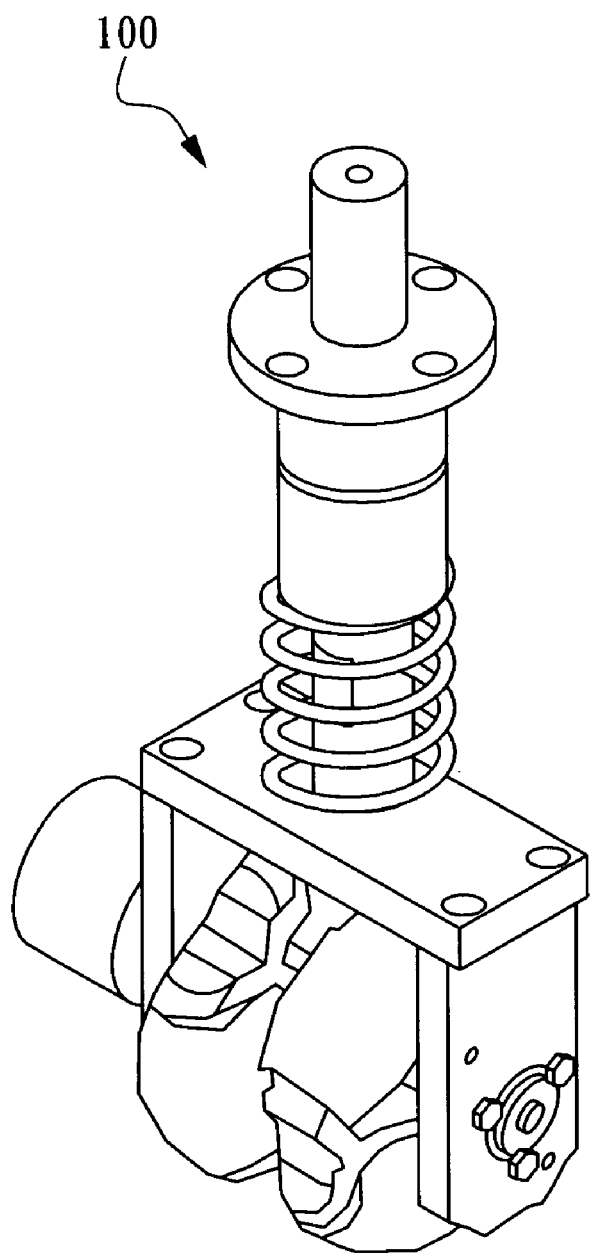
FIG. 2 is a schematic view of the omni-directional meter wheel of FIG. 1.

Please refer to FIG. 1 and FIG. 2, which are respectively an explode view and a three-dimensional schematic view of an omni-directional meter wheel according to a preferred embodiment of the invention. The omni-directional meter wheel 100 is mainly comprised of: an omni-directional wheel 101, capable or rolling forewarned/backward and sideway; and a rotary encoder 102; wherein the two sides of the omni-directional wheel 101 are respectively coupled to the two side supports 105, 106 by the use of the two bearings 103, 104; and the rotary encoder 102 is coupled to the omni-directional wheel 101 by the use of the bearing 103. In response to the forward/backward rotation of the omni-directional wheel 101 as it is contacting to the ground, the rotary encoder 102 is enabled to issue a pulse signal relating to the rotation of the omni-directional wheel 101, such as the rotation distance, the rotation velocity, etc., so that the pulse signal can be used by posterior operation of the omni-directional meter wheel 100. Moreover, a top support 107 is fixed at a place over the two side supports 105, 106, such that a supporting member 108 affixed to the top support 107 can be used for fixing the omni-directional meter wheel 100 to a mobile platform while cooperating with other supporting member (not shown). The elastic member 109 arranged between the top support 107 and the supporting member 108 can effectively buffer the vibrations caused when the rotating omni-directional wheel comes into contact with bumpy ground, such that the precision of the pulse signal issued by the rotary encoder 102 can be enhanced.

Figure 3:
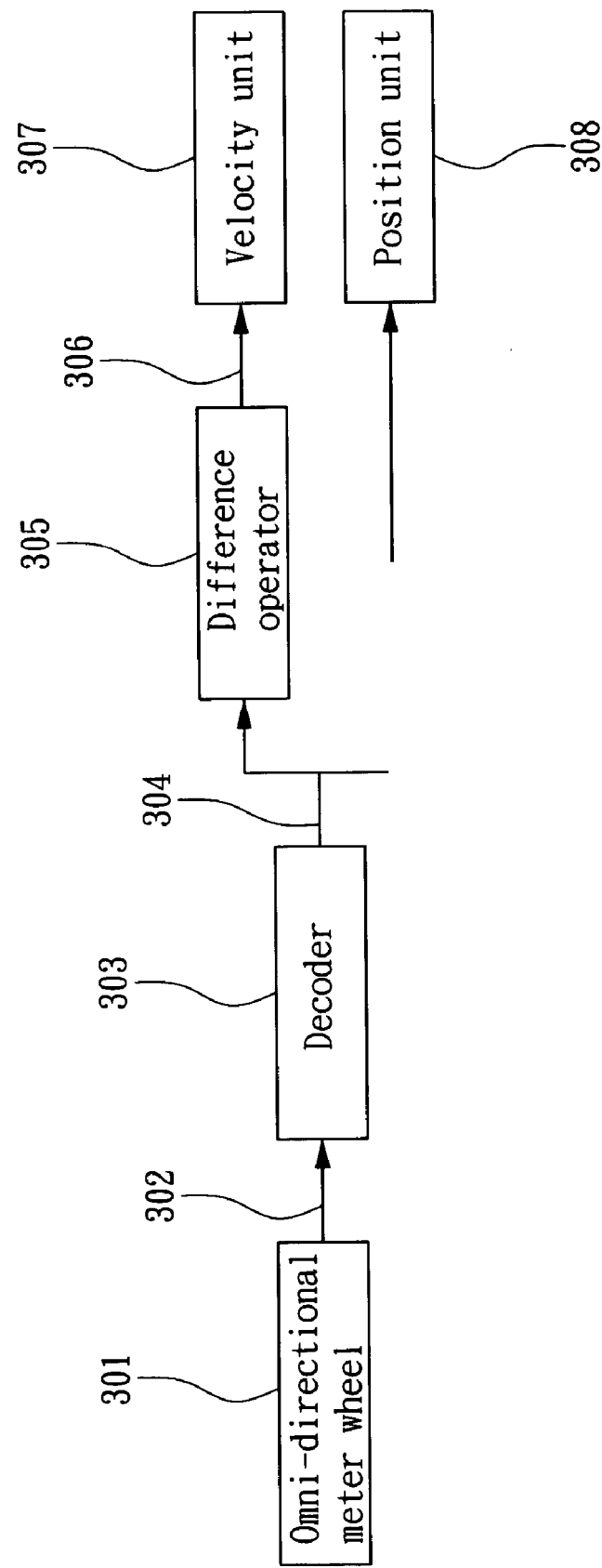
FIG. 3 is a functional diagram depicting the flow of signal processing of an operating omni-directional meter wheel according to a preferred embodiment of the invention.

Please refer to FIG. 3, which is a functional diagram depicting the flow of signal processing of an operating omni-directional meter wheel according to a preferred embodiment of the invention. As an omni-directional meter wheel 301 is operating independently, the rotary encoder attaching to the omni-directional meter wheel 301 is enabled to issue a pulse signal 302 relating to the rotation of the omni-directional wheel of the omni-directional meter wheel 301, such as the rotation distance, the rotation velocity, etc. The pulse signal 302 is then sent to the decoder 303 to be decoded into a count signal 304. Thereafter, the count signal 304 is fed to the difference operator 305 and the position unit 308 in respective. In the difference operator 305, a calculation of difference is operated upon the received count signal 304 so as to generate a difference signal 306 accordingly whereas the difference signal 306 is sent to the velocity unit 307 for calculating the velocity of the mobile platform as it is moving along a straight line. In the position unit 308, the moving distance of the mobile platform moving along a straight line can be calculated and obtained according to the received count signal 304.

Figure 4:
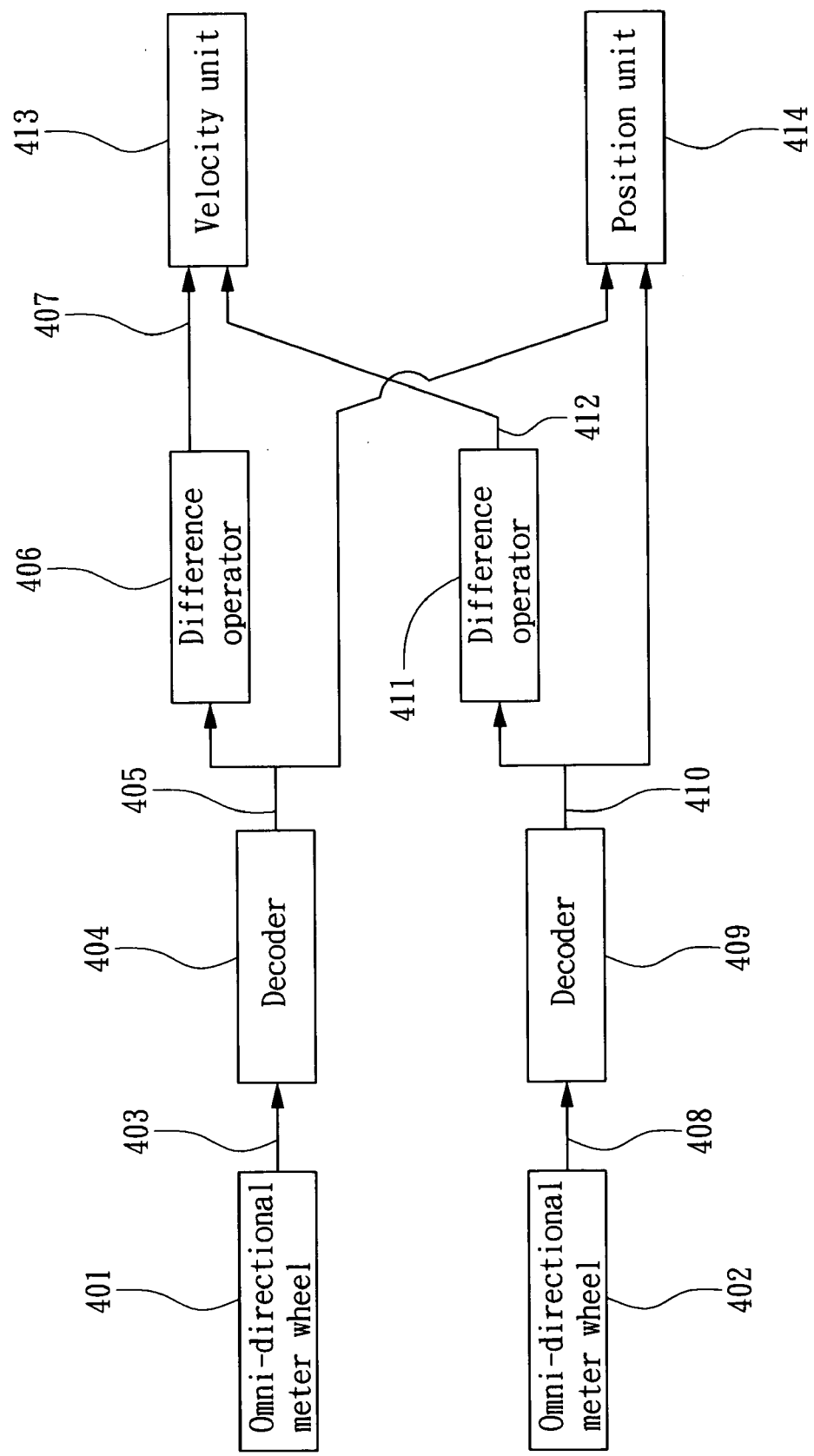
FIG. 4 is a functional diagram depicting the flow of signal processing of two cooperatively operating omni-directional meter wheels according to another preferred embodiment of the invention.

Please refer to FIG. 4, which is a functional diagram depicting the flow of signal processing of two cooperatively operating omni-directional meter wheels according to another preferred embodiment of the invention. It is preferred to arrange the forward/backward rotation directions of the two omni-directional meter wheels 401, 402 to be perpendicular to each other. As the omni-directional meter wheel 401 is operating, the rotary encoder attaching to the omni-directional meter wheel 401 is enabled to issue a pulse signal 403. The pulse signal 403 is then sent to the decoder 404 to be decoded into a count signal 405. Thereafter, the count signal 405 is fed to the difference operator 406 and the position unit 414 in respective. In the difference operator 406, a calculation of difference is operated upon the received count signal 405 so as to generate a difference signal 407 accordingly whereas the difference signal 407 is sent to the velocity unit 413. Similarly, as the omni-directional meter wheel 402 is operating, the rotary encoder attaching to the omni-directional meter wheel 402 is enabled to issue a pulse signal 408. The pulse signal 408 is then sent to the decoder 409 to be decoded into a count signal 410. Thereafter, the count signal 410 is fed to the difference operator 411 and, the position unit 414 in respective. In the difference operator 411, a calculation of difference is operated upon the received count signal 410 so as to generate a difference signal 412 accordingly whereas the difference signal 412 is sent to the velocity unit 413. In the velocity unit 413, the velocity of the mobile platform as it is moving is calculated and obtained according to the two received difference signals 407, 412. In the position unit 414, the moving distance of the mobile platform can be calculated and obtained according to the two received count signals 405, 410. Since the two omni-directional meter wheels 401, 402 are cooperatively operating together while being arranged perpendicular to each other, the two mutually perpendicular moving velocities and distances, measured along the two mutually perpendicular coordinates of a planar surface where the mobile platform is moving, can be obtained so that the positioning of the mobile platform on the planar surface can be calculated and thus acquired.

Figure 5:
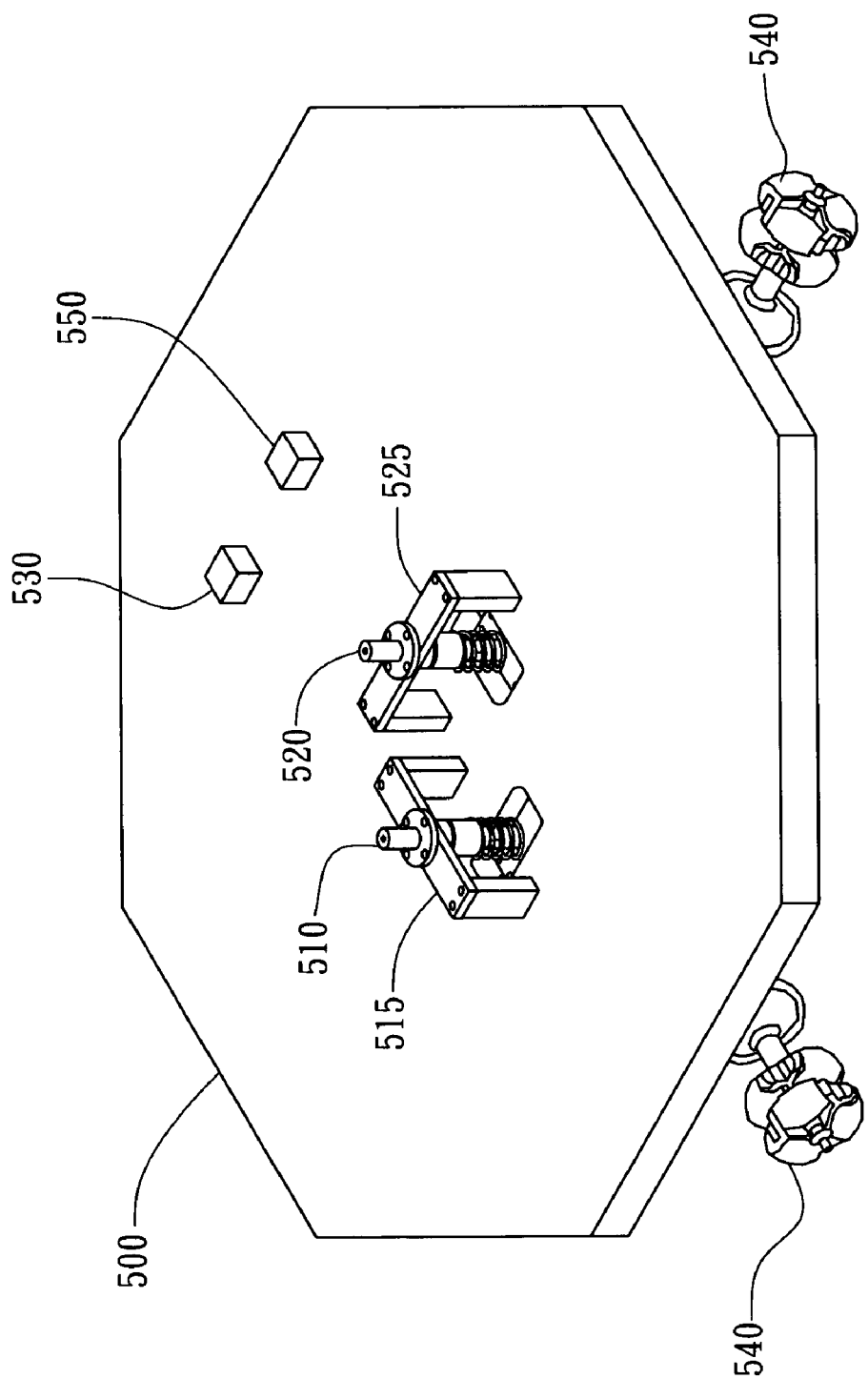
FIG. 5 is a schematic view of a mobile robot platform according to a preferred embodiment of the invention.

Please refer to FIG. 5, which is a schematic view of a mobile robot platform according to a preferred embodiment of the invention. In FIG. 5, two mutually perpendicular omni-directional meter wheels 510, 520 are arranged on a mobile platform 500, which are respectively fixed to the platform 500 by the two supporting structures 515, 525. In addition, a magnetic sensing module 530 and a plurality of rollers 540 are also arranged in the mobile platform 500, wherein the magnetic sensing module 530 can be an electrical compass that is capable of providing the location of the mobile platform 500 utilizing the variation of geomagnetic strength. It is noted that the roller can be any type of wheel. Moreover, a power driving unit, such as a motor, can be arranged on the mobile platform 500 to be used for driving the rollers 540 to rotate.

As the mobile platform 500 is moving, the rotary encoder of the omni-directional meter wheel 510 is enabled to issue pulse signals according to the rotation thereof while the rotary encoder of another omni-directional meter wheel 520 is also enabled to issue pulse signals according to the rotation thereof. Simultaneously, the magnetic sensing module 530 issues bit signals containing the locality of the mobile platform 500. As the pulse signals of the two rotary encoders and the bit signals are received by the signal processing unit 550 arranged on the mobile platform 500, the signal processing unit 550 will perform calculations upon those received signals so as to obtain the moving conditions of the moving mobile platform 500, such as velocity, position, angular velocity, angular position, and so on.

Figure 6:
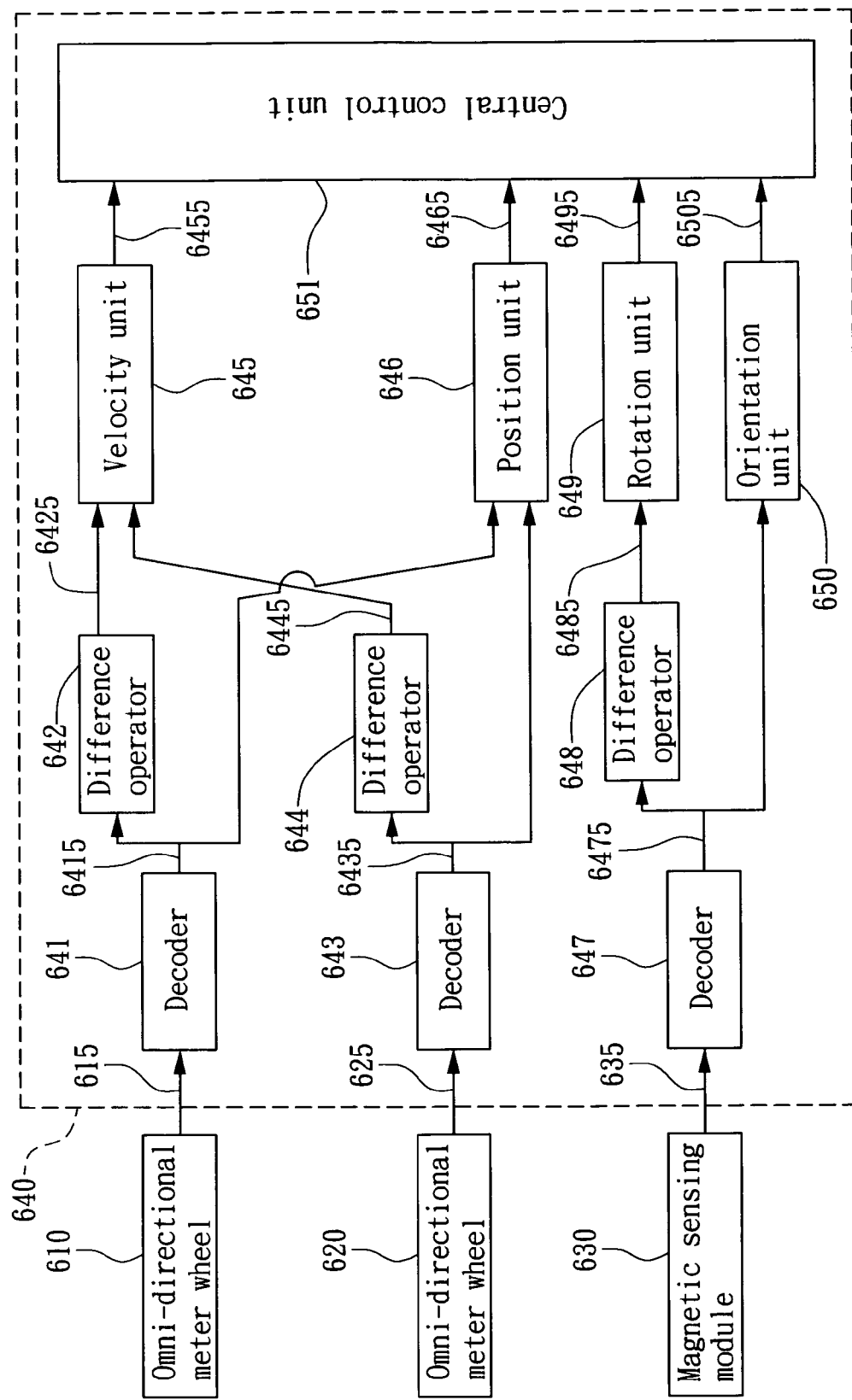
FIG. 6 is a functional diagram depicting the flow of signal processing of the mobile robot platform according to a preferred embodiment of the invention.

Please refer to FIG. 6, which is a functional diagram depicting the flow of signal processing of the mobile robot platform according to a preferred embodiment of the invention. As the mobile platform is moving, the rotary encoder of the first omni-directional meter wheel 610 is enabled to issue a pulse signal 615 while the rotary encoder of the second omni-directional meter wheel 620 is also enabled to issue a pulse signal 625, and simultaneously, the magnetic sensing module 630 issues a bit signal 635. As seen in FIG. 6, the signal processing unit 640 is used to receive the two pulse signal 615, 625 and the bit signal 635. In the signal processing unit 640, the pulse signal 615 is sent to the decoder 641 to be decoded into a count signal 6415. Thereafter, the count signal 6415 is fed to the difference operator 642 and the position unit 646 in respective. In the difference operator 642 a calculation of difference is operated upon the received count signal 6415 so as to generate a difference signal 6425 accordingly whereas the difference signal 6425 is sent to the velocity unit 645. Similarly, the pulse signal 625 is sent to the decoder 643 to be decoded into a count signal 6435. Thereafter, the count signal 6435 is fed to the difference operator 644 and the position unit 646 in respective. In the difference operator 644, a calculation of difference is operated upon the received count signal 6435 so as to generate a difference signal 6445 accordingly whereas the difference signal 6445 is sent to the velocity unit 645. In the velocity unit 645, the velocity of the mobile platform as it is moving is calculated and obtained according to the two received difference signals 6425, 6445, so as to issue a velocity signal 6455 accordingly. In the position unit 646, the moving distance of the mobile platform can be calculated and obtained according to the two received count signals 6415, 6435, so as to issue a position signal 6465 accordingly.

Moreover, the bit signal 635 is sent to the decoder 641 to be decoded by the decoder 647 into a digital signal 6475. Thereafter, the digital signal 6475 is fed to the difference operator 648 and the orientation unit 650 in respective. In the difference operator 648, a calculation of difference is operated upon the received digital signal 6475 so as to generate a difference signal 6485 accordingly whereas the difference signal 6485 is sent to the rotation unit 649 for calculating the angular velocity of the moving mobile platform so as to issue an angular velocity signal 6495 accordingly. In the orientation unit 650, the moving distance of the mobile platform can be calculated and obtained according to the received digital signal 6475 so as to issue an angular position signal 6505 accordingly.

Moreover, the central control unit 651 is used for receiving the position signal 6465, the velocity signal 6455, the angular position signal 6505 and the angular velocity signal 6495 so as to monitor the moving condition of the frame of the mobile robot platform while using the monitoring as feedback control of the mobile platform.

To sum up, the present invention provides a mobile robot platform and a method for sensing movement of the same, which are capable of simultaneously detecting the physical quantities of the platform, such as position, velocity, angular position and angular velocity, etc. Moreover, by the cooperation of the omni-directional meter wheel, which is featured by high stability, low complexity and low calibration requirement, and an electrical compass, the moving conditions of the mobile platform can be detected with high accuracy, but will not cause the complexity of the system applying the same to be greatly increased.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A mobile robot platform, comprising:
   a frame;
   at least an omni-directional meter wheel, being arranged on the frame, each further comprising:
      an omni-directional wheel;
      a side support, coupled to the omni-directional wheel by a bearing; and
      a rotary encoder, coupled to the omni-directional wheel by the bearing, for issuing a pulse signal with respect to the rotation of the omni-directional meter wheel;
   a magnetic sensing module, arranged on the frame, capable of issuing a bit signal with respect to the variation of geomagnetic strength; and
   a signal processing unit, for processing the bit signal and the pulse signal.

2. The mobile robot platform of claim 1, wherein a plurality of rollers are arranged on the frame.

3. The mobile robot platform of claim 2, wherein a power driving unit is arranged on the frame for driving the plural rollers to rotate.

4. The mobile robot platform of claim 1, wherein each omni-directional meter wheel further comprises an elastic member for buffering the vibrations caused when the rotating omni-directional wheel comes into contact with ground.

5. The mobile robot platform of claim 1, wherein the magnetic sensing module is an electrical compass.

6. The mobile robot platform of claim 1, wherein the signal processing unit, further comprising:
   at least a decoder, for decoding the pulse signal and generating a count signal accordingly; and
   a position unit, for performing a position calculation upon the count signal to generate a position signal accordingly.

7. The mobile robot platform of claim 1, wherein the signal processing unit, further comprising:
   at least a decoder, for decoding the pulse signal and generating a count signal accordingly;
   at least a difference operator, for performing a calculation of difference upon the count signal to generate a difference signal accordingly; and
   a velocity unit, for performing a velocity calculation upon the difference signal to generate a velocity signal accordingly.

8. The mobile robot platform of claim 1, wherein the signal processing unit, further comprising:
   at least a decoder, for decoding the bit signal and generating a digital signal accordingly;
   an orientation unit, for performing an orientation calculation upon the digital signal to generate an angular position signal accordingly.

9. The mobile robot platform of claim 1, wherein the signal processing unit, further comprising:
   at least a decoder, for decoding the bit signal and generating a digital signal accordingly;
   at least a difference operator, for performing a calculation of difference upon the digital signal to generate a difference signal accordingly; and
   a rotation unit, for performing a rotation calculation upon the digital signal to generate an angular speed signal accordingly.

10. The mobile robot platform of claim 1, wherein the signal processing unit, further comprising:
   a central control unit, for monitoring moving conditions of the frame.

11. A method for sensing movements of a moving mobile robot platform, comprising the steps of:
   providing a first omni-directional meter wheel and a second omni-directional meter wheel, each of which comprising an omni-directional wheel, a side support, and a rotary encoder for issuing a pulse signal with respect to the rotation of the omni-directional meter wheel, wherein both the side support and the rotary encoder are coupled to the omni-directional wheel by one bearing;
   decoding a pulse signal issued by the first omni-directional meter wheel to generate a first count signal while decoding another pulse signal issued by the second omni-directional meter wheel to generate a second count signal;
   performing a position calculation upon the first count signal and the second count signal to generate a position signal;
   performing a calculation of difference upon the first count signal to generate a first difference signal while performing a calculation of difference upon the second count signal to generate a second difference signal; and
   performing a velocity calculation upon the first difference signal and the second difference signal to generate a velocity signal.

12. The method claim 11, further comprising the steps of:
   providing a magnetic sensing module;
   decoding a bit signal issued by the magnetic sensing module to generate a digital signal;
   performing an orientation calculation upon the digital signal to generate an angular position signal; performing a calculation of difference upon the digital signal to generate a difference signal; and
   performing a rotation calculation upon the difference signal to generate an angular velocity signal.

13. The method claim 12, wherein the first omni-directional meter wheel, the second omni-directional meter wheel and the magnetic sensing module are arranged on a frame of the mobile robot platform.

14. The method claim 13, wherein the first omni-directional meter wheel is orientated to perpendicular to the second omni-directional meter wheel.

15. The method claim 13, wherein the magnetic sensing module is an electrical compass.

16. The method claim 13, wherein the frame further comprises a signal processing unit for receiving the pulse signal of the first omni-directional meter wheel, the pulse signal of the second omni-directional meter wheel and the bit signal of the magnetic sensing module.

17. The method claim 16, wherein the signal processing unit, further comprising: at least a decoder; at least a difference operator; a position unit; a velocity unit; an orientation unit; a rotation unit; and a central control unit.

18. The method claim 17, wherein each decoder is used for performing the decoding operation.

19. The method claim 17, wherein each difference operator is used for performing the calculation of difference.

20. The method claim 17, wherein the position unit is used for performing the position calculation to obtain the position of the frame of the mobile robot platform.

21. The method claim 17, wherein the velocity unit is used for performing the velocity calculation to obtain the velocity of the frame of the mobile robot platform.

22. The method claim 17, wherein the orientation unit is used for performing the orientation calculation to obtain the angular position of the frame of the mobile robot platform.

23. The method claim 17, wherein the rotation unit is used for performing the rotation calculation to obtain the angular velocity of the frame of the mobile robot platform.

24. The method claim 17, wherein the central control unit is used for receiving the position signal, the velocity signal, the angular position signal and the angular velocity signal so as to monitor the moving condition of the frame of the mobile robot platform.

* * * * *